United States Patent
Saha et al.

(10) Patent No.: US 10,613,899 B1
(45) Date of Patent: Apr. 7, 2020

(54) LOCK SCHEDULING USING MACHINE LEARNING

(71) Applicant: Servicenow, Inc., Santa Clara, CA (US)

(72) Inventors: Prabodh Saha, Hyderabad (IN); Amit Kumar Mall, Hyderabad (IN); Manojkumar Haridas Shende, Kirkland, WA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/185,815

(22) Filed: Nov. 9, 2018

(51) Int. Cl.
| | |
|---|---|
| *G06F 9/46* | (2006.01) |
| *G06F 9/50* | (2006.01) |
| *G06N 5/04* | (2006.01) |
| *G06N 20/00* | (2019.01) |
| *G06F 9/48* | (2006.01) |

(52) U.S. Cl.
CPC .......... *G06F 9/5005* (2013.01); *G06F 9/4881* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,816,898 B1 | 11/2004 | Scarpelli et al. | |
| 7,020,706 B2 | 3/2006 | Cates et al. | |
| 7,062,683 B2 | 6/2006 | Warpenburg et al. | |
| 7,350,209 B2 | 3/2008 | Shum | |
| 7,610,512 B2 | 10/2009 | Gerber | |
| 7,617,073 B2 | 11/2009 | Trinon et al. | |
| 7,716,353 B2 | 5/2010 | Golovinsky et al. | |
| 7,769,718 B2 | 8/2010 | Murley et al. | |
| 7,890,802 B2 | 2/2011 | Gerber | |
| 7,925,981 B2 | 4/2011 | Pourheidari et al. | |
| 7,945,860 B2 | 5/2011 | Vambenepe et al. | |
| 7,966,398 B2 | 6/2011 | Wiles, Jr. | |
| 8,224,683 B2 | 7/2012 | Manos | |
| 8,266,096 B2 | 9/2012 | Navarrete et al. | |
| 8,402,127 B2 | 3/2013 | Solin | |
| 8,457,928 B2 | 6/2013 | Dang et al. | |
| 8,478,569 B2 | 7/2013 | Scarpelli et al. | |
| 8,612,408 B2 | 12/2013 | Trinon et al. | |
| 8,674,992 B2 | 3/2014 | Poston et al. | |
| 8,689,241 B2 | 4/2014 | Naik et al. | |
| 8,719,829 B2 * | 5/2014 | Mukherjee ................ G06F 9/52 718/1 |
| 8,743,121 B2 | 6/2014 | Peuter | |
| 8,832,652 B2 | 9/2014 | Mueller et al. | |

(Continued)

*Primary Examiner* — Gregory A Kessler
(74) *Attorney, Agent, or Firm* — Fletcher Yoder PC

(57) ABSTRACT

The present approach relates to systems and methods for facilitating run time predictions for cloud-computing automated tasks (e.g., automated tasks), and using the predicted run time to schedule resource locking. A predictive model may predict the automated task run time based on historical run time to completion, and the run time may be updated using machine learning. Resource lock schedules may be determined for a queue of automated tasks utilizing the resource based on the predicted run time for the various types of automated tasks. The predicted run time may be used to reserve a resource for the given duration, such that the resource is not available for use for another task.

19 Claims, 6 Drawing Sheets

(56) References Cited

U.S. PATENT DOCUMENTS

| | | | |
|---|---|---|---|
| 8,887,133 B2 | 11/2014 | Behnia et al. | |
| 9,065,763 B2 | 6/2015 | Ding et al. | |
| 9,098,322 B2 | 8/2015 | Apte et al. | |
| 9,122,552 B2 | 9/2015 | Whitney et al. | |
| 9,239,857 B2 | 1/2016 | Trinon et al. | |
| 9,317,327 B2 | 4/2016 | Apte et al. | |
| 9,363,252 B2 | 6/2016 | Mueller et al. | |
| 9,535,737 B2 | 1/2017 | Joy | |
| 9,645,833 B2 | 5/2017 | Mueller et al. | |
| 9,654,473 B2 | 5/2017 | Miller | |
| 9,766,935 B2 | 9/2017 | Kelkar et al. | |
| 9,792,387 B2 | 10/2017 | George et al. | |
| 9,805,322 B2 | 10/2017 | Keikar et al. | |
| 9,819,729 B2 | 11/2017 | Moon et al. | |
| 10,133,775 B1 * | 11/2018 | Ramalingam | G06F 16/2453 |
| 10,248,679 B2 | 4/2019 | Chandrashekar et al. | |
| 2012/0278812 A1 * | 11/2012 | Wang | G06F 9/505 |
| | | | 718/104 |
| 2013/0191836 A1 * | 7/2013 | Meyer | G06F 9/4881 |
| | | | 718/103 |
| 2015/0234675 A1 * | 8/2015 | Steiss | G06F 16/23 |
| | | | 718/100 |

\* cited by examiner

US 10,613,899 B1

LOCK SCHEDULING USING MACHINE LEARNING

BACKGROUND

The present disclosure relates generally to predicting and automating computing resource locking durations using predictive modeling.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Information Technology (IT) networks may include a number of computing resources (e.g. computing devices, switches, etc.) and software resources (e.g. database applications) that may be used to maintain a cloud-computing network infrastructure. Maintaining a network may utilize the resources for client or administrative based task automations, such as cloning or moving client instances, applying updates, performing database maintenance, and so forth, which may require reserving or locking resources for a given time period to perform the automated task. By way of example, moving a client instance may require twice the amount of time as cloning a client instance. Thus, some automated tasks may have a longer run time than other automated tasks.

Part of maintaining the network may allow administrators to schedule a locking time and duration for a particular resource to perform various automated tasks. In this manner, the resource may be locked for a given time period to complete an automated task and is unavailable for use for another task. However, in view of the various automated tasks that may be performed on resources that may each require different lock durations, determining a precise automated task run time for a lock schedule may be difficult to implement in practice. Further, in order to accommodate a sequence of tasks to be performed or applied, it is not uncommon for the expected durations of the respective tasks to be inflated (i.e., to insure that the preceding task is complete prior to the scheduled time to begin the next task) so as to avoid a conflict. This can result in the time a resource is locked or otherwise deemed unavailable being extended beyond what is actually needed in most cases.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to systems and methods for facilitating run time predictions associated with cloud-computing automated tasks (e.g., automations), and using the predicted run time to schedule resource locking.

The systems and methods disclosed herein determine improved or optimal resource lock schedules for a queue of automated tasks based on predictive modeling approaches that may be used to predict run times for some or all of the automated tasks. The predictive modeling may use a database of historical run times to accurately predict a run time for the various automated tasks that may be performed. The system and methods utilize the predicted run time to reserve a resource for the given time period, such that the resource is no longer available for use for another task. In some implementations, the actual run time for a given task may be used post hoc to update the database of historical run times, which may in turn effect subsequent estimates generated using the predictive modeling based on the database. In this manner, the system may learn to more accurately predict a run time for a given automated task and schedule resource locking without unnecessarily locking a resource past the necessary time to complete the automated task.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
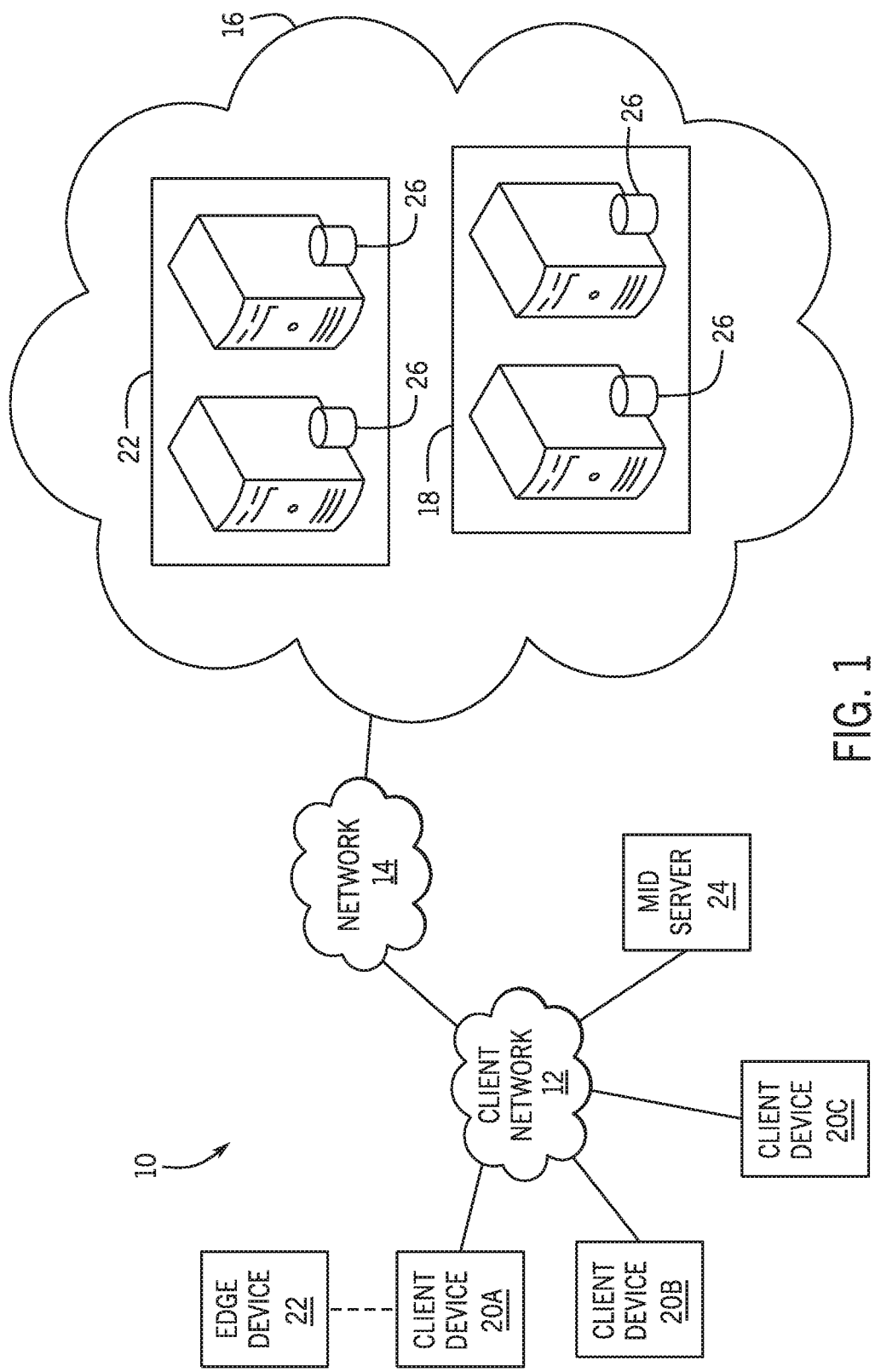
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "machine learning" refers to one or more algorithms learning or changing its properties in response to ongoing or periodic training or use. In accordance with certain aspects discussed herein, machine learning approaches may be used to model and make predictions related to off-line or lock time of an application to accommodate an automated task being performed. Based on the implementation, a machine learning algorithm may update or modify its operation based on an updated data set, through performing network configuration changes, or through other suitable approaches.

Furthermore, as used herein, the term "resource" refers to a device or processor-executable code used to maintain the cloud-computing network, such as hardware resources (e.g. computing devices, switches, web servers, etc.) and software resources (e.g. database applications, etc.). As used herein, the term "lock" or "locking" refers to reserving or limiting access to or operation of a resource in a computing environment, such as a multi-instance or multi-tenant cloud-based platform.

As discussed herein, implementing or scheduling an administrative or client automated task may involve locking resources for a duration when the automated task is performed, such as to complete the automated tasks. By way of example, one such automated task may be the cloning of a client instance. In this example, cloning an instance may take hours or days, and thus, the resources used to implement the cloning and/or being cloned may be locked for a particular duration to allow the automated task to complete.

In some implementations, the resources locked pending execution of a respective automated task or other automated tasks may be uniformly locked regardless of automated task type, i.e., a uniform or standardized block of time is set aside during which the resource in question is locked. In such circumstances, the resources may be locked for a duration that exceeds the time needed to complete the automated tasks. Further, as it is not unusual for a series or sequence of automated tasks to be performed on one or more resources, the overall resource lock schedule to complete multiple automated tasks may far exceed the actual run time of the aggregated tasks.

Accordingly, it is now appreciated that there is a need to improve resource lock scheduling so as to reduce or eliminate time allocated resource locking during which an automated tasks is not running. However, in view of the diverse automated tasks implemented to maintain a complex computing environment, determining optimal run times used to schedule resource locking may be difficult to implement in practice.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which performing and scheduling resource lock operations as discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices 20 are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center 18 could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server 26 instances handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 instances causing outages for all customers allocated to the particular server 26 instance. In such circumstances, client instances may be moved to another data center 18, and thus, may require resource locking to perform the instance move.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2. As discussed herein, as part of maintaining or implementing a computer environment, such as those described above, various automatic tasks or automated tasks, such as cloning or moving a customer or server 26 instance that impact one or more resources may be routinely implemented. The automated tasks may be executed in accordance with a resource lock schedule, as will be discussed in detail in FIG. 4 and FIG. 5.

Figure 2:
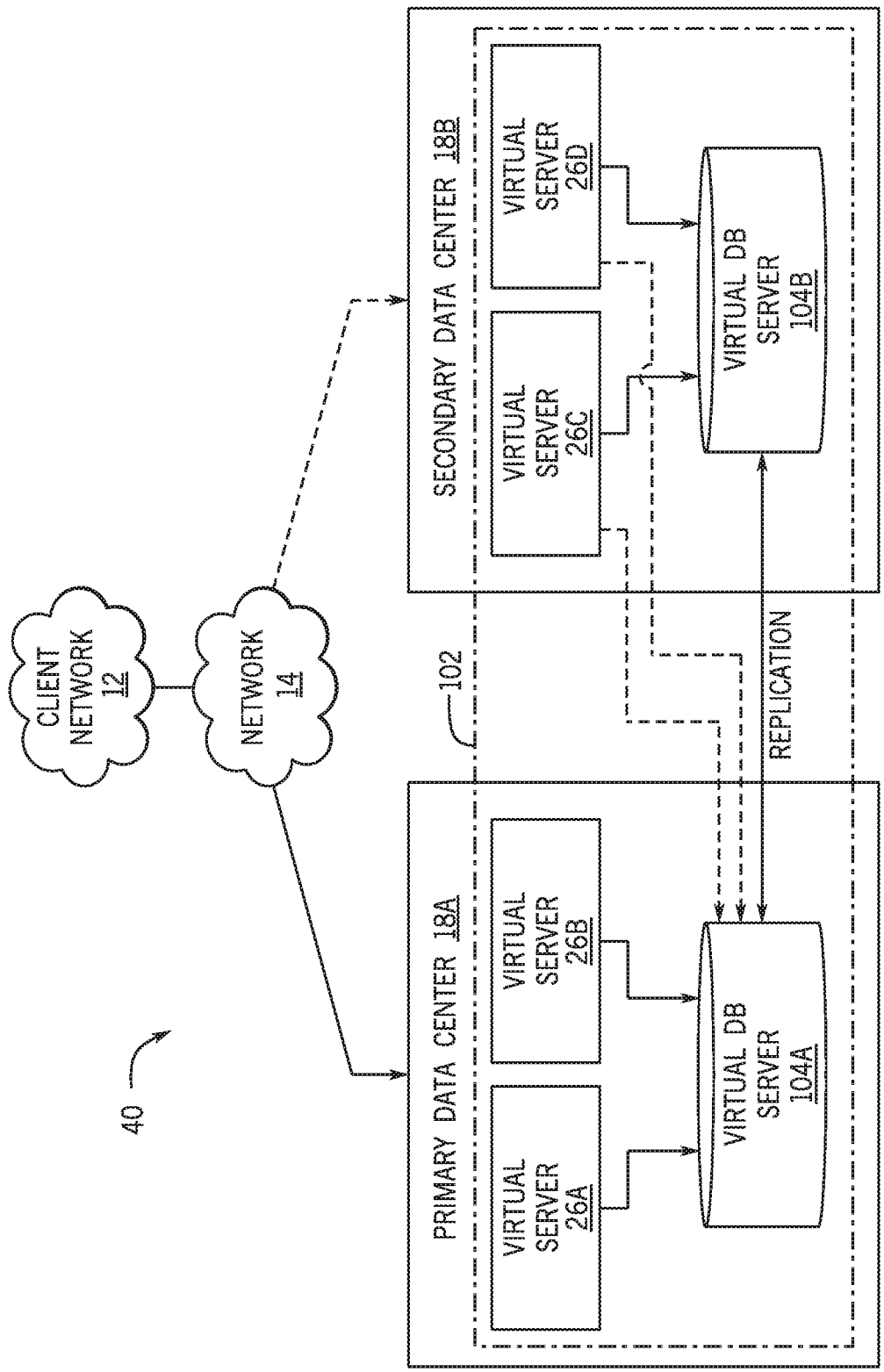
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 40 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2). The virtual servers 26A, 26B, 26C, 26D and virtual database servers 104A, 104B may be resources utilized in resource lock scheduling to perform automated tasks, or may themselves be resources that are locked, as will be described in detail in FIG. 4 and FIG. 5.

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B (e.g., via the network 14).

As shown in FIG. 2, the primary virtual database server 104A may backup data to the secondary virtual database server 104B using a database replication operation, such as prior to an automated task that moves a client instance for maintenance purposes. Additionally or alternatively, the database replication may also be an automated task that may reserve resources for a duration. The replication of data between data centers could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario (e.g., automated tasks). Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server 104B instance for processing. The replications and maintenance automated tasks may utilize and lock resources, some of which may be the same resources, and thus, the automated tasks may be in a queue for a resource lock schedule.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 16 is implemented using data centers 18, other embodiments of the platform 16 are not limited to data centers 18 and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
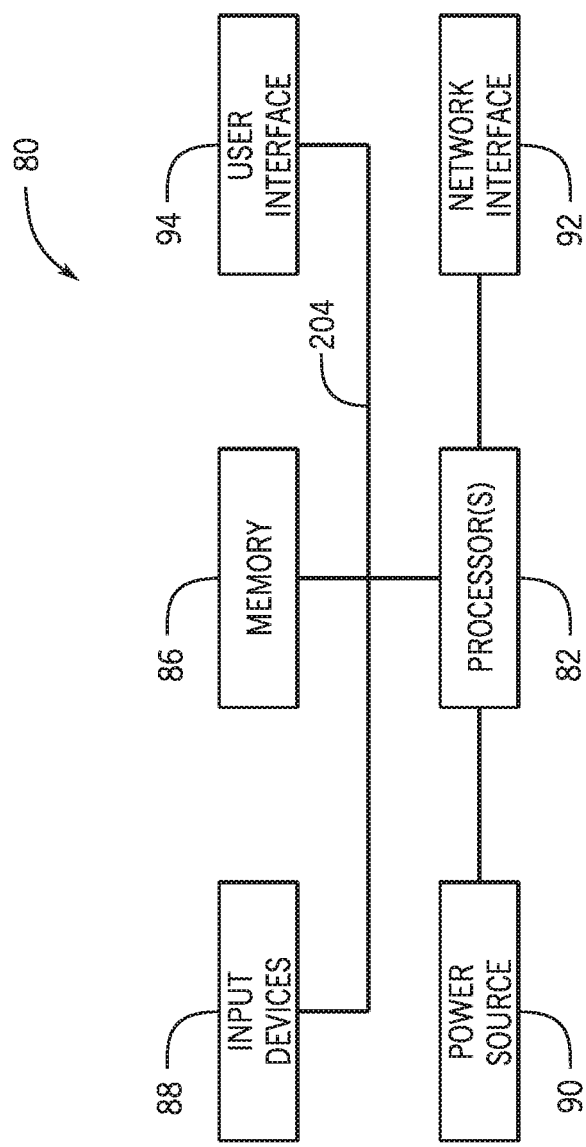
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

With the preceding in mind, the present approach relates to locking one or more resources (e.g., hardware, applications, databases) provided as part of the cloud computing system 10 described above, as part of performing or running one or more automated tasks that implicate that resource.

Figure 4:
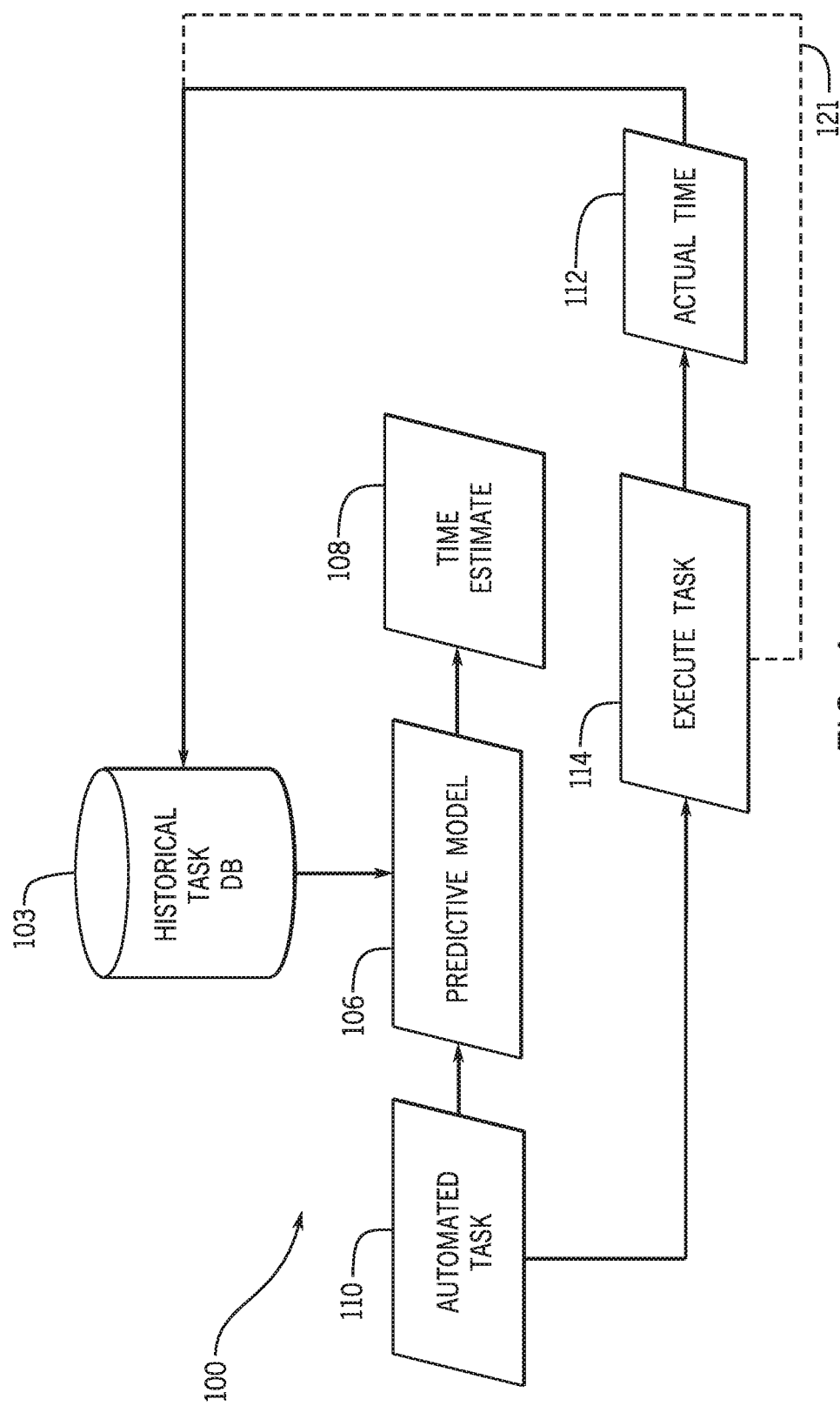
FIG. 4 is a flow diagram of a predictive model used to predict run times for automated tasks, in accordance with aspects of the present disclosure.

With this in mind, FIG. 4 is a process flow diagram 100 depicting events that may go in to constructing and/or parameterizing a predictive model 106 that can be used to generate an estimated time 108 for completion of one or more automated tasks 110 that may be performed on a resource of a cloud computing system 10, which in turn may allow more efficient locking and handling of such resources when such automated tasks 110 are performed in practice.

In the depicted example, the predictive model 106, examples of which are discussed in greater detail below, may be parameterized by or otherwise rely on a data store (e.g., a database of historical task database 103) populated with data or records corresponding to prior automated tasks 110, e.g., the actual run or execution times 112 for the respective automated tasks 110 and one or more factors (indicated by dashed line 121) that may be used to characterize a given run or execution (block 114) of an automated task 110 that may impact a run time of the respective automated task 110. Examples of such factors that may be related to a given run of an automated task 110 may include, but are not limited to the resource or resource upon which the respective task was performed, a time of day and/or week, network conditions or characteristics (e.g., bandwidth, network speed, latency, and so forth), available computing resources, and so forth). In this manner, the historical task database 103 (or comparable data store) includes data that can be used to associate a given task 110 or type of task with one or more factors that may be relevant in modeling task run times for new or upcoming automated task 110, such as to generate an estimated run time 108 for such automated tasks 110 based on the nature of the automated task 110 and other factors 121 related to the planned execution of the task that may be used in parameterizing the predictive model 106. As discussed in greater detail below, an estimated run time 108 for a given automated task 110 derived in this manner may be used as the basis for a corresponding resource reservation duration used to schedule resource locks in accordance with aspects of the present disclosure. Further, as different automated tasks 110 are performed over time, the actual time 112 needed to complete the respective automated tasks 110 may be automatically tracked, monitored, and/or recorded in the historical task database 103, thereby allowing the performance of the predictive model 106 to be improved over time.

The steps illustrated in the process 100 may be performed by a cloud computing system 10 operated by service or administrative agents, for example, for the purpose of locking resources impacted by one or more automated tasks performed on a computing platform. Furthermore, the steps illustrated in the process 100 are meant to facilitate discussion and are not intended to limit the scope of this disclosure, since additional steps may be performed, certain steps may be omitted, and the illustrated steps may be performed in any order.

In the depicted example, an automated task 110 to be performed, such as a task to resolve a service issue or problem, to apply an upgrade or update, or to otherwise improve or support operation of a client instance, may be input to a predictive model 106 as part of training the predictive model 106 and/or improving a store of historical task database 103 accessed by the predictive model 106. The automated task 110 may be associated with a title or description allowing the task to be properly characterized and referenced both as a historical data point and for use by the predictive model 106 in generating an estimated run time 108 of the automated task 110, which is output by the predictive model 106.

With respect to the predictive model 106, in one implementation the predictive model 106 comprises one or more predictive statistical models trained or configured to estimate the run time 108 for a given automated task 110, such as in conjunction with one or more execution specific factors 121. For example, in one implementation the predictive model 106 may be based on a linear regression model or models. Such linear regression models may derive a linear statistical relationship describing a given automated task 110 and the observed run times for such tasks taking into account factors 121 related to the resource in question (e.g., model, age, service history), the network environment and context, and so forth. Based on this statistical relationship, for a given automated task 110 and set of factors 121, the estimated run time 108 of a respective automated task 110 may be derived. As noted above, the estimated run time 108 for a given automated task 110 may serve as the basis for determining an optimal resource lock duration to complete the automated task 110 and may, therefore, be used to schedule resource locking for a resource impacted by the automated task 110.

Additionally or alternatively, the predictive model 106 may use a random forest or random decision forest statistical model to predict optimum automated task durations. In accordance with such an approach, the historical task database 103 may be used to fit a multitude of decision trees as part of the training process any may output mean prediction (i.e., regression) of the individual trees to generate an estimate of the estimate task run time 108. In this example, the greater number of decision trees may allow for a more accurate prediction.

As used herein, such adaptive and updated approaches whereby the predictive models 106 employed in estimating run times for automated tasks 110 adapt over time based on actual task run times are machine learning based approaches. In particular, in certain implementations, the predictive model 106 may be construed to be a machine learning approach that interfaces with the automated task historical task database 103 to update its model predictions based on the updated data and information stored within the historical task database 103.

Figure 5:
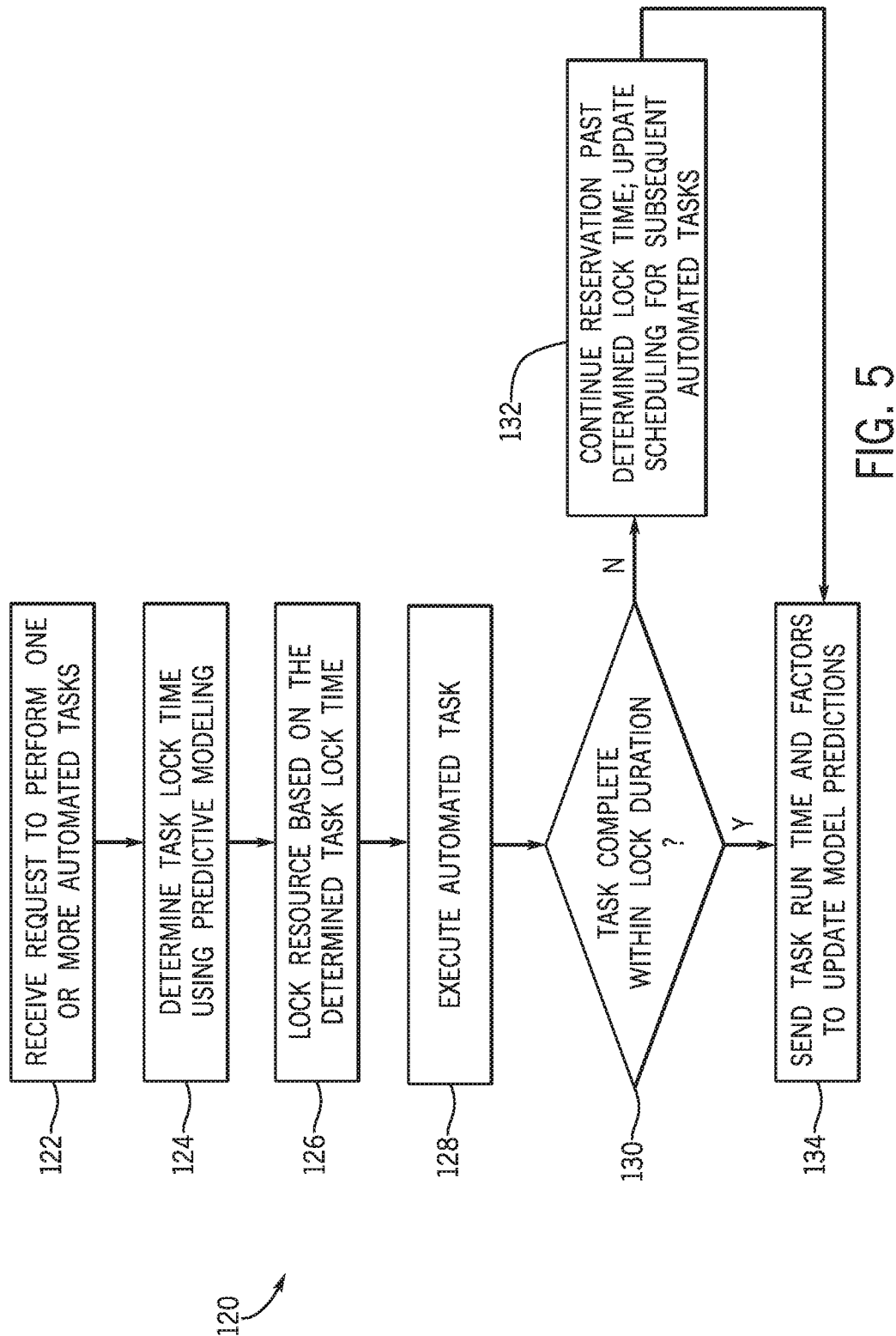
FIG. 5 is a process flow diagram of a process to schedule resource locking for an automated task based on the generated predicted run time of FIG. 5, in accordance with aspects of the present disclosure.

The preceding illustrates aspects of generating a time estimate 108 for an automated task 110 using predictive modeling and the generation and updating of historical data utilized by the predictive model 106. Turning to FIG. 5, a process flow 120 for performing automated tasks 110 on resources of a cloud computing system 10 is illustrated in which the time 108 estimates generated for such automated tasks 110 are used to reserve or lock the resources affected by an automated task 110 in an efficient manner such that the resource is not locked for a longer duration than is necessary to complete a given task.

In accordance with this example, an indication is received (step 122), from a user or automated agent, that an automated task 110 or sequence of tasks are to be performed that will impact a resource (e.g., a hardware resource, database, application, and so forth) present in a networked environment, such as a cloud computing system 10.

Based on the automated task(s) 110 to be performed and any known factors used to characterize such automated tasks 110 in the predictive model 106 (e.g., resources impacted, network topology and/or bandwidth, resource or network utilization, and so forth), an estimated time 108 for each automated task 110 is determined using a predictive model 106, as discussed with respect to FIG. 4. Based on the estimated time 108 for each automated task 110, a task lock time for the impacted resource(s) and for a given automated task 110 may be determined (step 124) based on the estimated time 108 alone or on the estimated time 108 plus some added or buffer time (e.g., five minutes, 10 minutes, a half hour, and hour, etc.) to account for the estimated time 108 being exceeded (such as due to unaccounted for factors) when the automated task 110 is executed. The buffer time may act as a failsafe mechanism to prevent a subsequent automated task that may be scheduled for the same resource from concurrently initiating.

In this example, the resource(s) are locked (step 126) at the time the automated task 110 is to be run for the determined task lock time. By way of example, locking a resource may involve stopping threads executing on or for that resource, severing current connections to the resource, and/or preventing new connections to the resource during the lock period.

At a scheduled time (or on demand) and once the resource(s) in question are locked for the determined duration, a respective automated task 110 may be executed (step 128) or otherwise performed. As shown in the depicted example, a determination may be made (decision block 130) whether a given automated task 110 designated to run within a given interval in which a resource is locked completed within the lock period. If the automated task 110 is completed within the lock period for the resource, information about the automated task 110, its execution (i.e., run time) and other factors may be stored (step 134) to the historical task database 103 to be used in future predictive model applications. If the automated task 110 runs longer than the allotted lock interval for the respective resource, the automated task 110 is allowed to complete and the resource remains locked. Any subsequent scheduled tasks having corresponding resource locks are rescheduled (and their lock reservations adjusted) to run after completion of the current task. As in the preceding case, information about the automated task 110, its execution (i.e., run time) and other factors may be stored (step 134) to the historical task database 103 to be used in future predictive model applications so as to improve the performance of the predictive model 106.

In this manner, when the automated task 110 is completed, regardless of whether it completed within the estimated time 108 or otherwise, the machine learning feature of the predictive model 106 may be improved to more precisely predict the run time for the respective automated task 110 in the future. Thus, the machine learning techniques of the predictive model 106 may be continuously improved to predict precise automated task times for resource lock scheduling.

Figure 6:
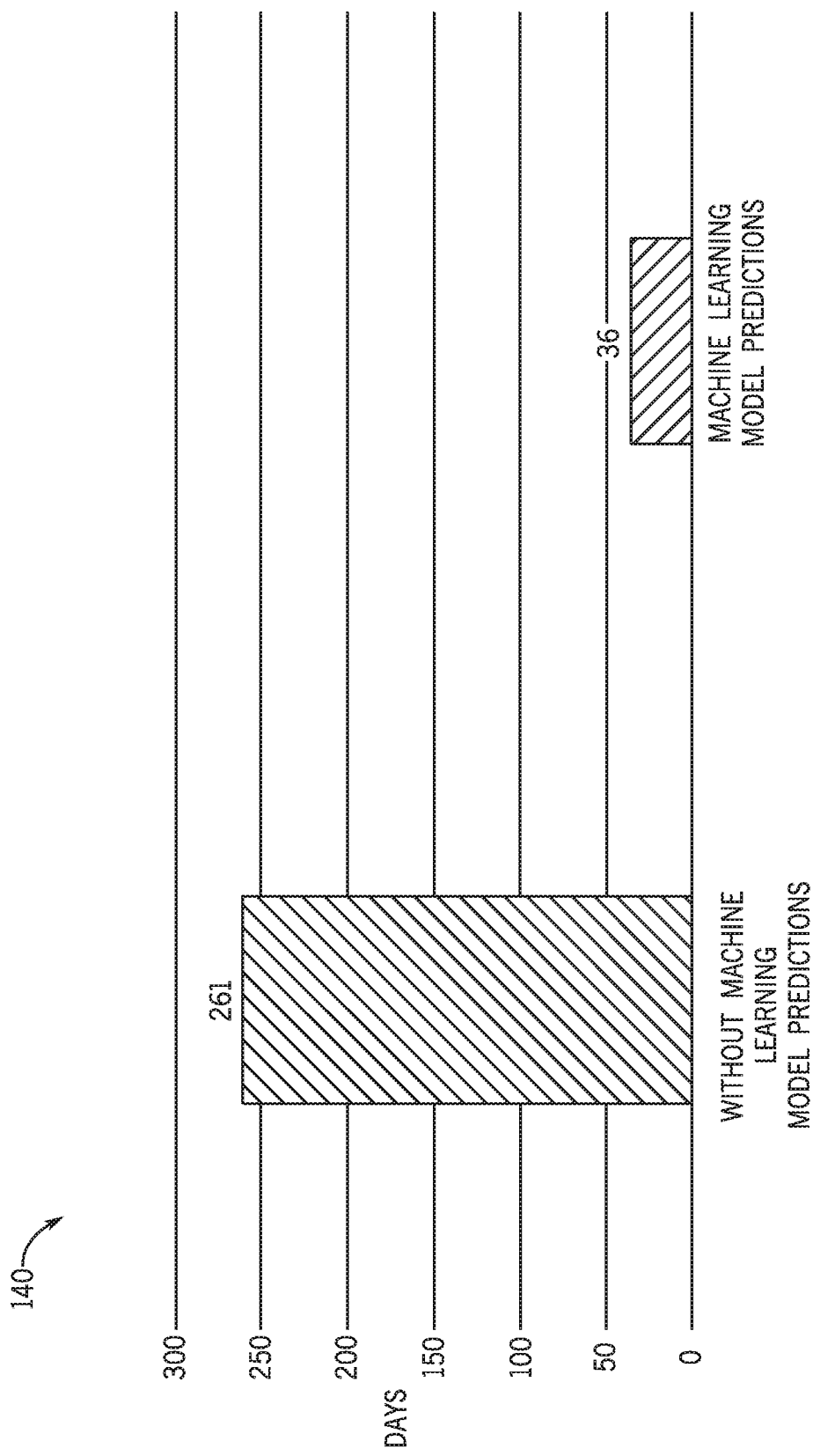
FIG. 6 is a statistical graph of a resource lock duration for an automated task before and after utilizing the disclosed lock scheduling techniques, in accordance with aspects of the present disclosure.

With the preceding in mind, and by way of illustrating benefits of the present approach of scheduling resource locks based on model predictions and machine learning, FIG. 6 shows a statistical graph 140 comparing lock scheduling techniques. As illustrated, statistical graph 140 indicates that resource lock time attributable to automated tasks may, in the aggregate, take 261 days using conventional time blocking approaches, i.e., without model predictions using machine learning. However, by basing resource lock times for automated task on predictive modeling approaches as discussed herein, this time may be reduced to take 36 days over the time interval under review. In particular, the machine learning feature of the model predictions may allow for a proactive approach in reserving resources for the actual duration necessary to complete an automated task. In this manner, a resource may not be reserved unnecessarily for hours or days without considering the automated task type and its historical run time. Thus, the techniques discussed herein may impact resource utilization and allow for efficient resource locks and precise lock scheduling.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more client instances hosted by a platform, wherein the one or more client instances are accessible by one or more remote client networks;
a memory configured to store instructions;
a processor configured to execute instructions, wherein the instructions, when executed, cause the processor to perform operations comprising:
receiving a request to perform an automated task, wherein the automated task impacts at least one resource utilized by the system;
in response to the request, determining a predicted run time for the automated task using a statistical predictive model, wherein the automated task is associated with one or both of a title or a description to characterize the automated task as a task type for use by the statistical predictive model in generating a predicted run time for the task type;
locking a respective resource based on at least the predicted run time; and
executing the automated task.

2. The system of claim 1, wherein the system is further configured to: update a historical database used to parameterize the statistical predictive model based on an actual run time of the automated task.

3. The system of claim 1, wherein the statistical predictive model performs linear regression, random forest, or a combination thereof, to determine the predicted run time.

4. The system of claim 1, wherein the respective resource is reserved for the predicted run time plus a buffer time.

5. The system of claim 2, wherein the statistical predictive model uses the update to predict subsequent runtimes for automated tasks.

6. The system of claim 5, wherein a resource lock schedule is determined for automated tasks, wherein the resource lock schedule locks the respective resource for a duration based on one or more predicted run times for the automated tasks.

7. The system of claim 6, wherein a plurality of automated tasks utilizing the respective resource are in a queue based on the resource lock schedule.

8. The system of claim 7, wherein one or more subsequent automated tasks wait in queue past a respective predicted runtime when an initial automated task is not completed within the predicted run time.

9. The system of claim 8, wherein the respective resource is locked past the predicted run time of the initial automated task when the initial automated task is not completed.

10. A method for determining resource lock duration for an automated task performed in a computing system comprising one or more client instances hosted by a platform, wherein the one or more client instances are accessible by one or more remote client networks, the method comprising:
receiving a request to perform an automated task, wherein the automated task impacts at least one resource utilized by the system;
in response to the request, determining a predicted run time for the automated task using a statistical predictive model, wherein the automated task is associated with one or both of a title or a description to characterize the automated task as a task type for use by the statistical predictive model in generating a predicted run time for the task type;
locking a respective resource based on at least the predicted run time; and
executing the automated task.

11. The method of claim 10, wherein the predicted run time for the automated task is based on a historical database of data, records, or a combination thereof, corresponding to prior automated tasks.

12. The method of claim 11, wherein the method updates the historical database used to parameterize the statistical predictive model based on an actual run time of the automated task.

13. The method of claim 10, wherein the statistical predictive model performs linear regression, random forest, or a combination thereof, to determine the predicted run time.

14. The method of claim 10, wherein the respective resource is reserved for the predicted run time plus a buffer time.

15. The method of claim 12, wherein the statistical predictive model uses the updated historical database to predict subsequent runtimes for automated tasks.

16. A non-transitory computer-readable storage medium storing executable instructions that, when executed by a processor, cause operations to be performed comprising:

receiving a request by a computing system to perform an automated task, wherein the automated task impacts at least one resource utilized by the computing system;

in response to the request, determining a predicted run time for the automated task using a statistical predictive model, wherein the automated task is associated with one or both of a title or a description to characterize the automated task as a task type for use by the statistical predictive model in generating a predicted run time for the task type;

locking a respective resource based on at least the predicted run time; and executing the automated task.

17. The non-transitory computer-readable storage medium of claim 16, wherein a resource lock schedule is determined for automated tasks, wherein the resource lock schedule locks the respective resource for a duration based on one or more predicted run times for the automated tasks.

18. The non-transitory computer-readable storage medium of claim 17, wherein a plurality of automated tasks utilizing the respective resource are in a queue based on the resource lock schedule.

19. The non-transitory computer-readable storage medium of claim 18, wherein one or more subsequent automated tasks wait in queue past a respective predicted runtime when an initial automated task is not completed within the predicted run time.

* * * * *